(12) United States Patent
Johnson et al.

(10) Patent No.: US 9,169,529 B2
(45) Date of Patent: Oct. 27, 2015

(54) INDUCTIVE HEATING FOR HARDENING OF GEAR TEETH AND COMPONENTS ALIKE

(71) Applicant: The Timken Company, Canton, OH (US)

(72) Inventors: Stephen Johnson, North Canton, OH (US); Xiaolan Ai, Massillon, OH (US); Stephen B. Fitch, Massillon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 13/964,819

(22) Filed: Aug. 12, 2013

(65) Prior Publication Data

US 2013/0327451 A1   Dec. 12, 2013

Related U.S. Application Data

(63) Continuation of application No. 12/937,042, filed as application No. PCT/US2009/040140 on Apr. 10, 2009, now abandoned.

(60) Provisional application No. 61/044,303, filed on Apr. 11, 2008.

(51) Int. Cl.
   *C21D 9/32* (2006.01)
   *H05B 6/40* (2006.01)
   *H05B 6/10* (2006.01)

(52) U.S. Cl.
   CPC *C21D 9/32* (2013.01); *H05B 6/101* (2013.01); *H05B 6/405* (2013.01)

(58) Field of Classification Search
   CPC ....... B05D 3/0272; B23P 25/003; B27M 1/06
   USPC .................................................. 219/600–677
   See application file for complete search history.

(56) References Cited

U.S. PATENT DOCUMENTS

| 2,308,788 A | 1/1943 | Somes |
| 2,912,522 A | 11/1959 | Knowles et al. |

(Continued)

FOREIGN PATENT DOCUMENTS

| BE | 441547 | 4/1941 |
| BE | 485416 | 11/1948 |

(Continued)

OTHER PUBLICATIONS

Office action received from USPTO for U.S. Appl. No. 12/937,042, dated Jul. 17, 2014, 31 pages.

(Continued)

*Primary Examiner* — Tu B Hoang
*Assistant Examiner* — Thomas Ward
(74) *Attorney, Agent, or Firm* — Michael Best & Friedrich LLP

(57) ABSTRACT

A method for heat treating a gear having gear teeth includes removably mounting the gear on a work-piece holder, moving one of either a magnet assembly or the work-piece holder to bring the gear and the magnet assembly into heating proximity, rotating the magnet assembly for a desired amount of time while said magnet assembly and gear are in heating proximity to each other to heat treat surfaces of the gear teeth, moving one of either the magnet assembly or the work-piece holder relative to the other to bring different surfaces of the gear into heating proximity with said magnet assembly, and repeating for each opposed pair of gear teeth surfaces until all said gear teeth surfaces are heat treated.

6 Claims, 3 Drawing Sheets

(56) References Cited

U.S. PATENT DOCUMENTS

| | | | |
|---|---|---|---|
| 3,272,956 A * | 9/1966 | Baermann | 219/645 |
| 3,372,261 A | 3/1968 | Porterfield | |
| 3,629,093 A | 12/1971 | Sickels | |
| 3,684,852 A | 8/1972 | Seyfried | |
| 4,481,397 A | 11/1984 | Maurice et al. | |
| 4,486,638 A | 12/1984 | de Bennetot | |
| 4,675,488 A | 6/1987 | Mucha et al. | |
| 4,761,527 A | 8/1988 | Mohr | |
| 4,855,551 A * | 8/1989 | Mucha et al. | 219/640 |
| 4,894,501 A | 1/1990 | Pfaffmann et al. | |
| 5,012,060 A | 4/1991 | Gerard | |
| 5,134,264 A | 7/1992 | Burger et al. | |
| 5,234,201 A | 8/1993 | Chatterjee et al. | |
| 5,344,536 A | 9/1994 | Obuchi et al. | |
| 5,550,354 A | 8/1996 | Kimura et al. | |
| 5,746,580 A | 5/1998 | Parket et al. | |
| 5,914,065 A | 6/1999 | Alavi | |
| 6,144,020 A | 11/2000 | Usui et al. | |
| 6,177,660 B1 | 1/2001 | Usui et al. | |
| 6,250,875 B1 | 6/2001 | Bauer et al. | |
| 6,297,484 B1 | 10/2001 | Usui et al. | |
| 6,303,908 B1 | 10/2001 | Yamaga et al. | |
| 6,331,744 B1 | 12/2001 | Chen et al. | |
| 6,538,239 B1 | 3/2003 | Anderson et al. | |
| 6,555,800 B1 | 4/2003 | Zahn | |
| 6,833,107 B2 | 12/2004 | Kuriyama et al. | |
| 6,933,460 B2 | 8/2005 | Vanden Brande et al. | |
| 7,146,735 B2 | 12/2006 | Bracht et al. | |
| 7,179,416 B2 | 2/2007 | Ueno | |
| 7,258,526 B2 | 8/2007 | Dooley et al. | |
| 7,339,144 B2 | 3/2008 | Lunneborg | |
| 7,339,145 B2 | 3/2008 | Magnusson | |
| 8,283,615 B1 | 10/2012 | Albertson | |
| 8,389,911 B2 | 3/2013 | Matsui | |
| 2006/0086729 A1 * | 4/2006 | Lunneborg | 219/628 |
| 2006/0124632 A1 | 6/2006 | Stuer et al. | |
| 2006/0157476 A1 | 7/2006 | Magnusson | |

FOREIGN PATENT DOCUMENTS

| | | |
|---|---|---|
| CN | 201056580 | 5/2008 |
| DE | 956259 | 1/1957 |
| DE | 10154100 | 5/2003 |
| EP | 1293577 A2 | 3/2003 |
| EP | 1400603 | 3/2004 |
| FR | 2536943 | 6/1984 |
| GB | 2111360 | 6/1983 |
| JP | 57169522 | 10/1982 |
| JP | S60-892 | 1/1985 |
| JP | 60162726 | 8/1985 |
| JP | 62127419 | 6/1987 |
| JP | 01086474 | 3/1989 |
| JP | 04149988 | 5/1992 |
| JP | 05082248 | 4/1993 |
| JP | 07220863 | 8/1995 |
| JP | 2003278558 | 10/2003 |
| JP | 2005174801 | 6/2005 |
| JP | 60141827 | 7/2005 |
| WO | WO 9939769 | 8/1999 |
| WO | WO 02087285 | 10/2002 |
| WO | WO 03053103 | 6/2003 |
| WO | WO 2005043722 | 5/2005 |
| WO | WO 2009126850 | 10/2009 |
| WO | WO 2010100082 | 9/2010 |
| WO | WO 2011020952 | 2/2011 |

OTHER PUBLICATIONS

Takashi Watanabe et al., "Analysis of a New Induction Heating Device by Using Permanent Magnets" (May 2005) IEEE Transitions on Magnetics, vol. 41, No. 5, 4 pages.

PCT/US2009/040140 International Search Report and Written Opinion dated Jul. 20, 2009.

* cited by examiner

INDUCTIVE HEATING FOR HARDENING OF GEAR TEETH AND COMPONENTS ALIKE

CROSS REFERENCE TO RELATED APPLICATIONS

This application is a continuation of U.S. patent application Ser. No. 12/937,042, which is the United States National Stage under 35 U.S.C. §371 of International Application Serial No. PCT/US2009/040140, having an international filing date of Apr. 10, 2009, and claims priority to U.S. Provisional App. No. 61/044,303 filed Apr. 11, 2008. Each of the just-noted applications are incorporated herein by reference.

STATEMENT REGARDING FEDERALLY SPONSORED RESEARCH OR DEVELOPMENT

Not Applicable

BACKGROUND OF THE INVENTION

This application is related to magnetic induction heating of gear teeth and components, and in particular to an apparatus and method for moving magnets relative to gear teeth to effectuate magnetic inductive heating.

Case hardening of a work-piece through heat treatment has been a common practice in the bearing and gear industry for many years. Various means and methods have been known and utilized to various degrees over the years.

Induction heating is well known and utilized throughout the industry for its effectiveness and environmental friendliness. As an electrically conductive work-piece is brought into a varying magnetic field, eddy currents are generated. These eddy currents result in an Ohm loss that is manifested as heat generation. Traditionally, the varying magnetic field is generated by a copper tooling coil which is energized with an alternating electric current, the frequency of which is regulated by power electronic switches such as IGBTs and MOSFETs. The tooling coil in most cases is placed stationary relative to the work-piece, and the work-piece is moved relative to the coil. Heat generation and the heated volume in the work-piece are determined by (1) magnetic flux density, (2) electric conductivity of the work-piece, and (3) the frequency of magnetic field variation. To increase heat generation, electric voltage and frequency of the tooling coil has to be increased. This results in a noticeable power loss within the tooling coil and power electronic switches. In addition, the tooling coil is not very flexible and the system cost is relatively high.

SUMMARY OF THE DISCLOSURE

Briefly stated an apparatus heat treating gear teeth via magnetic inductive heating comprises a base, a magnet assembly and a workpiece (or gear) holder. The magnet assembly and work-piece holder are operatively mounted to the base. The magnet assembly comprises a disk having a plurality of permanent magnets positioned around a circumference of the disk. The magnets having opposed faces defining north and south poles of the magnets; and the magnets are arranged about the disk such that the poles of the magnets alternate with respect to each other. As seen, the faces (and hence the poles) are directed generally outwardly from the disk. Alternatively, a pole can be defined by a group of magnets. In this case, the poles defined by the group of magnets alternate with respect to the pole defined by the adjacent groups of magnets. The magnet assembly is concentric with and rotatable about a first axis and is rotatable in a first plane. The magnet assembly is operatively connected to a spindle drive to be rotated thereby.

The magnet assembly disk can comprise an inner portion and a cage extending radially from a radial outer surface of the inner portion. The disk inner portion has front and back surfaces, each of which has an inner portion and a sloped outer portion. The sloped outer portions sloping toward each other such that the disk (44) reduces in thickness. The cage comprising a plurality of trapezoidally shaped dividers extending radially outwardly from the radial outer surface of the inner portion and a circumferential rail extending around the dividers. The dividers and rail, in combination, define a plurality of pockets which receive the magnets.

The work-piece holder is adapted to removably hold a gear to be heat treated. The work-piece holder is concentric with, and rotatable about a second axis, which is spaced from the first axis (A1). The work-piece holder is rotatable in a second plane which intersects the first plane. The work-piece holder is operatively connected to a work-piece drive to be rotated thereby. The work-piece holder rotated in operatively connected to a work-piece drive to be rotatably driven thereby.

The apparatus further includes a means for moving one or both the magnet assembly and work-piece holder relative to each other to bring the magnet assembly and gear tooth surfaces into heating proximity with each other; such that rotation of the magnet assembly induces heating of the gear tooth surfaces. The means for moving the magnet assembly and/or the work-piece holder comprises a slide block movable along the base parallel to the first axis and a spindle block movable relative to the slide block and parallel to the second axis. The magnet assembly is rotatably mounted to the spindle block.

To heat treat the tooth surfaces of the gear with the apparatus described above, the gear is removably mounted on the work-piece holder. One of the magnet assembly and work-piece holder is moved relative to the other to bring the gear and the magnet assembly into heating proximity. This last noted step comprises positioning the magnet assembly and the work-piece holder relative to each other such that the opposed faces of the magnets of the magnet assembly face the surfaces of the gear teeth to be treated. The magnet assembly is then rotated for a desired amount of time to heat treat the gear teeth surfaces proximate the magnet assembly. When the heat treatment of the gear teeth surfaces is completed, the magnet assembly and work-piece holder are moved so that a second pair of gear teeth surfaces can be brought into heating proximity with the magnet assembly to be heated. This procedure is followed until all the gear teeth surfaces are heat treated.

The step of bringing a new pair of gear teeth surfaces into heating proximity with the magnet assembly can include moving one of the magnet assembly and the work-piece holder relative to the other to separate the magnet assembly and the gear such that the magnet assembly and gear are no longer in heat treating proximity to each other and rotating the work-piece holder to bring untreated gear teeth surfaces into position to be heated; and then moving one of the magnet assembly and the work-piece relative to the other to bring different surfaces or different portions of the same surfaces of the gear into heating proximity with the magnet assembly.

In an illustrative embodiment, it is the magnet assembly that is moved relative to the work-piece holder, and the magnet assembly can be moved both vertically and horizontally relative to the work-piece holder.

The heat treatment of the gear teeth can be conducted in a continuous operation. To do so, the magnet assembly (40) is continuously moved in a reciprocating fashion passed the gear teeth surfaces a rate which will allow for the gear teeth surfaces to be heat treated a desired amount. The work-piece holder is rotated in a step-wise manner when the magnet assembly is at the top or bottom of its vertical travel path.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1A:
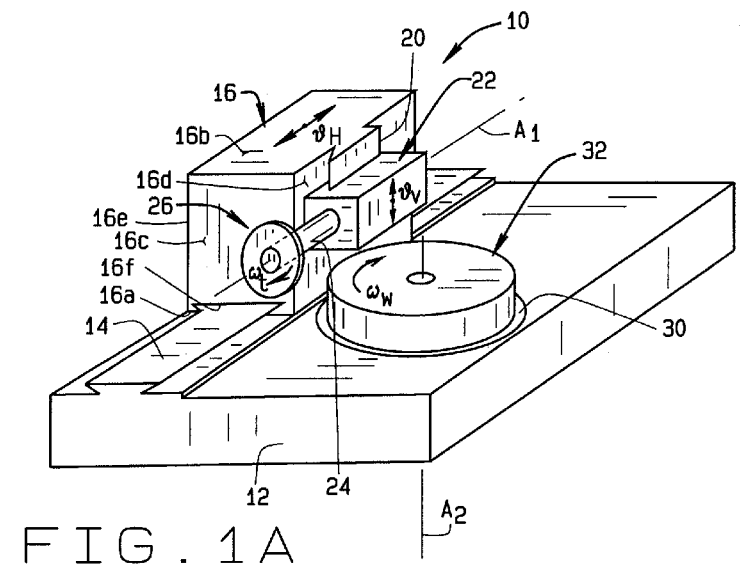
FIG. 1a is a perspective view of an inductive heating apparatus made in accordance with the present invention.

An induction heating apparatus 10 of the present invention is shown generally in FIG. 1. The apparatus 10 includes a base 12 having an elongate guide 14 thereon. The guide 14 can be a dove tailed rib (as shown) or a channel or V-grooves. The guide 14 is shown to extend between opposed edges of the base, but can be shorter if desired. A sliding unit 16 is moveable along the guide 14. The sliding unit has a bottom surface 16a, a top surface 16b, end surfaces 16c, a front surface 16d and a back surface 16e. The sliding unit 16 is adapted to mate with the guide 14. In the illustrative embodiment shown, the bottom surface 16a of the sliding unit 16 has a dove tailed groove or channel 16f formed therein which extends the length of the unit 16. The groove 16f is sized and shaped correspondingly to the guide 14 to receive the guide 14. As seen, while the groove and rib enable the sliding unit 16 to move horizontally relative to the base 12, the rib and groove are correspondingly shaped to prevent the sliding unit 16 from moving vertically relative to the base 12 or in any other direction perpendicular to the guide 14. As can be appreciated, other shapes and configurations can be used for the guide and groove. For example, the guide could comprise two spaced apart flanges or ribs extending upwardly from the base between which the sliding member would slide. A rib or groove could be formed in the side of the slide 16 with the other of the rib or groove formed in the flanges. This rib and groove combination could then be used to retain the sliding unit between the flanges. Alternatively, the guide could comprise a channel in the base 12 sufficiently wide to receive the sliding unit 16. The sliding unit could be provided with either a rib or a groove on its sides, and the channel could be provided with the other of the rib and groove.

The sliding unit is moved along the guide 14 relative to the base 12 by means of a power screw (not shown). Any other desired means to move the sliding unit 16 along the guide 14 can be used if desired. The motor moves the sliding unit at a speed $V_H$ which can be a constant speed or a variable speed. That is, the motor can move the sliding unit 16 at only one speed or the speed of the motor can be varied.

A guide 20 is formed on the front surface 16d of the slide unit 16. The guide 20 is perpendicular to the guide 14 and to the plane of the base 12. A spindle unit 22 is mounted on the slide unit 16 to slide along the slide unit guide 20. In the illustrative embodiment shown, the spindle unit is provided with a groove which is sized and shaped to correspond to the size and shape of the guide 20. As shown, the spindle unit groove and the guide 20 are both generally dove-tailed in shape. As with the base 12 and slide unit 16, the mounting of the spindle unit 22 to the slide unit 16 can be of any desired configuration which will allow the spindle unit to move relative to the slide unit 16 and which will retain the spindle unit adjacent the slide unit (i.e., will prevent the spindle unit from falling off of the slide unit). A second power screw (not shown) is used to move the spindle unit 22 along the slide unit guide 20. Again, any desired means can be used to move the spindle unit 22 along the guide 20. The spindle unit 22 is moved along the slide unit guide 20 by a motor (not shown) which moves the spindle unit 22 at a velocity of $V_V$. As with the slide unit motor, the spindle unit motor can be a one-speed motor or a variable speed motor.

A spindle 24 extends from an end face of the spindle unit 22, and a tool piece 26 is mounted at the end of the spindle 24. The spindle unit 22 includes a motor (not shown) which rotates the spindle 24, and hence the tool piece 26, about an axis $A_1$ at a rotational velocity $\omega_t$. The axis $A_1$ is generally parallel to the plane of the base 12. The motor which drives the spindle 24 can be the same motor as, or a different motor than, the motor which moves the spindle unit along the slide unit guide 20.

A work-piece holder 30 is rotatably supported on the base to rotate about an axis $A_2$ and in a plane generally parallel to the plane of the base 12. Thus, axis $A_2$ is set at an angle relative to the axis $A_1$ and is spaced horizontally from the axis $A_1$. As illustratively shown, the axis $A_2$ is generally perpendicular to the plane of the base 12 and to the axis $A_1$. The axes $A_1$ and $A_2$ do not actually intersect. The distance between the axes is used to set an air gap G (FIG. 5) between the gear teeth and magnets, as will be explained below. The work-piece holder 30 is rotated by a motor (not shown) at a rotational velocity of $\omega_w$. The work-piece holder 30 is adapted to hold a work-piece 32, which illustratively is a gear. The work-piece 32 is removably held to the work-piece holder 30 by any desired means. For example, the work-piece 32 can be held to the work-piece holder 30 by mechanical, electromagnetic, hydraulic, or pneumatic means. The work-piece 32 can be a gear, as shown in the drawings. The work-piece gear 32 has teeth 32a with leading and trailing surfaces 32b.

As can be appreciated, tool piece 26 is movable relative to the gear or work-piece 32 along (or parallel to) both the axis $A_1$ and axis $A_2$ via movement of the spindle unit 22 and the slide unit 16. The position of the spindle unit 22 and slide unit 16, along with the speed of movement $V_H$ and $V_v$ are controlled to commanded values. In fact, a controller can be provided to control the rotation of the work-piece holder 30 (and hence the work-piece 32), the rotation of the tool piece 26, the horizontal movement of the slide unit 16 and the vertical movement of the spindle unit 22.

Figure 2:
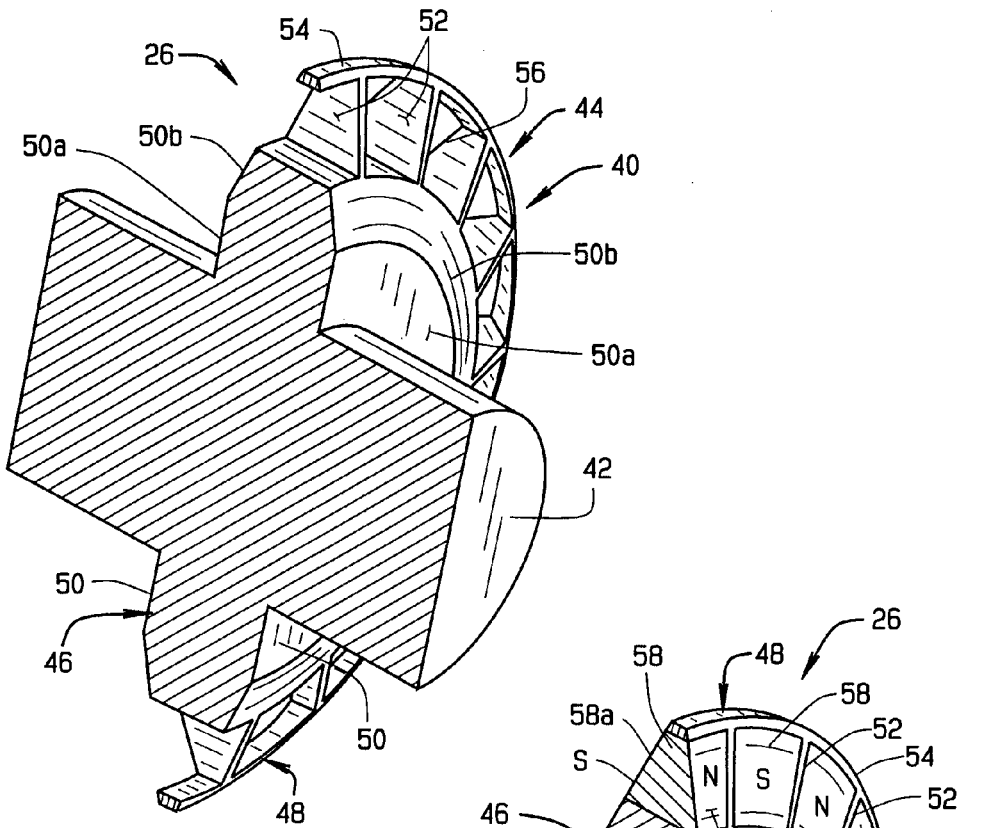
FIG. 2 is a cross-sectional view of the permanent magnet member without the permanent magnets.
Figure 3:
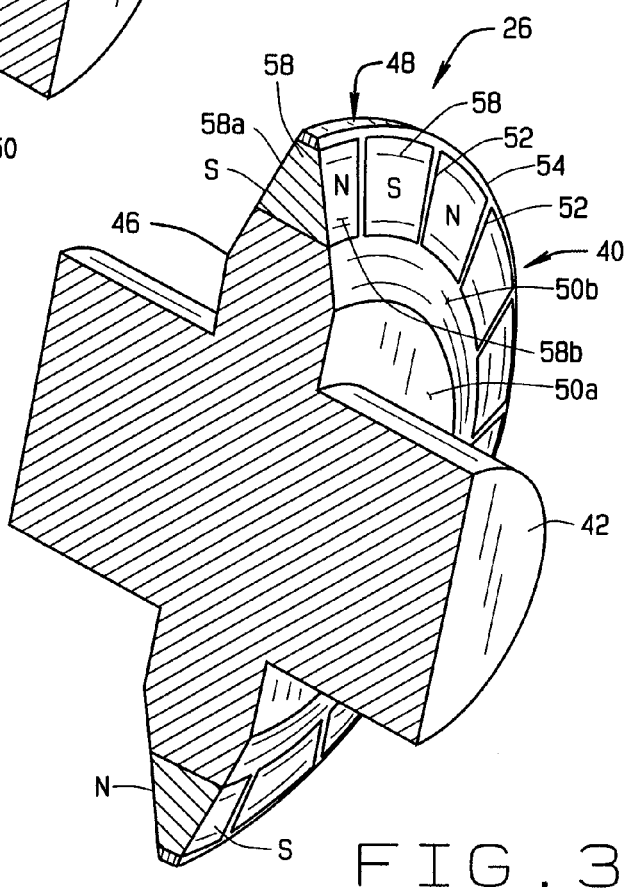
FIG. 3 is a cross-sectional view of the permanent magnet member with the permanent magnets installed.

Turning to FIGS. 2 and 3, the tool piece 26 comprises a magnet assembly 40. The magnet assembly 40 comprises a shaft 42 and a circular disk 44 extending perpendicularly from the shaft 42. The shaft 42 can be a continuation of the spindle 24. If the shaft 42 is separate from the spindle 24, then a connector is provided such that the shaft 42 will be rotationally driven by rotation of the spindle 24. The disk 44 and shaft 42 are concentrically arranged. The disk 44 comprises an inner portion 46 and a cage 48 extending radially from a radial outer edge of the inner portion 46. The inner portion 46 has a front and back surfaces 50 each of which includes an inner portion 50a extending from the shaft 42 and a sloped portion 50b. The sloped portion 50b of the front and back surfaces 50 slope toward each other so that the disk 44 reduces in thickness.

Figure 4:
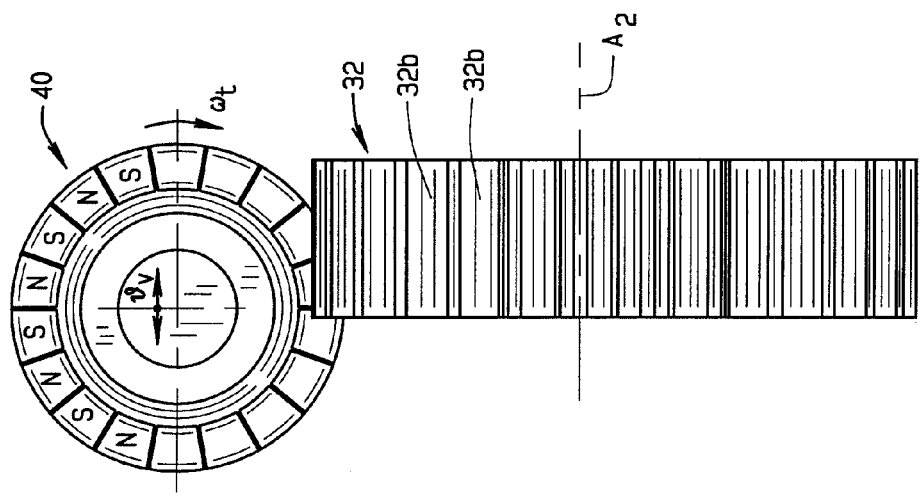
FIG. 4 is an elevational view of the magnet member and gear.

The cage 48 is comprised of a plurality of trapezoidally shaped dividers 52 which extend radially outwardly from the edge of the disk inner portion 46. The dividers have sloped sides, the slopes of which correspond to the slope of the sloped portion 50b of the disk inner portion 46 or a point along the sloped portion 50b. Stated differently, the sides of the dividers are, in essence, a continuation of the sloped surface 50b of the disk inner portion 46. A circumferential rail 54 extends surrounds the dividers 52. The dividers 52 and rail 54, in combination, define a plurality of pockets 56. A generally trapezoidally shaped, permanent magnet 58 is embedded, or otherwise secured, in each pocket 56. As seen in FIG. 3, the magnets have tapered outer surfaces 58a,b, one of which defines a north pole of the magnet and one of which defines a south pole of the magnet. The magnets are arranged such that the poles alternate, as seen in FIGS. 3 and 4. Hence, as seen in the drawings, the poles are directed generally outwardly from the disk. Although the drawings show that the individual magnets 58 define poles, and that the poles of adjacent magnets alternate, a pole could be defined by a group of magnets. For example, a pole could be defined by two or three adjacent magnets. In this case, the poles as defined by the groups of magnets would then alternate.

During a heating operation, the work-piece (i.e., gear) 32 is rotatably driven by the work-piece holder 30 about the axis $A_2$ at a speed $\omega_w$; and the magnet assembly 40 is rotatably driven by the spindle unit 22 about the axis $A_1$ at a speed of $\omega_r$. While the magnet assembly 40 is spinning, it is moved along the axis A1 and parallel to the axis A2 at speeds of $V_H$ and $V_V$ by movement of the spindle unit 22 and the slide unit 16 along their respective guides. The rotation of the magnet assembly 40 and the movement of the magnet assembly 40 in the horizontal and vertical planes (defined by the motion of the slide unit 16 and the spindle unit 22) each can be done continuously or in a step-wise fashion. The rotational motion of the magnet assembly 40 at the rate $\omega_r$ produces a varying magnetic field and is the primary motion. The rotational motion of the work-piece 32 at the rate of $\omega_w$, and the horizontal and vertical motions of the spindle unit 22 and slide unit 16 at rates $V_H$ and $V_V$ bring new surfaces of the work-piece 32 into the heating area or zone and are referred to as the feed motions. The rate of the primary motion (i.e., the value of $\omega_r$) is determined by the required hardening properties of the work-piece 32; and the rates of the feed motions (i.e., the values of $\omega_w$, $V_H$, and $V_V$) are determined by geometry of the work-piece as well as the desired hardening properties of the work-piece.

Figure 1B:
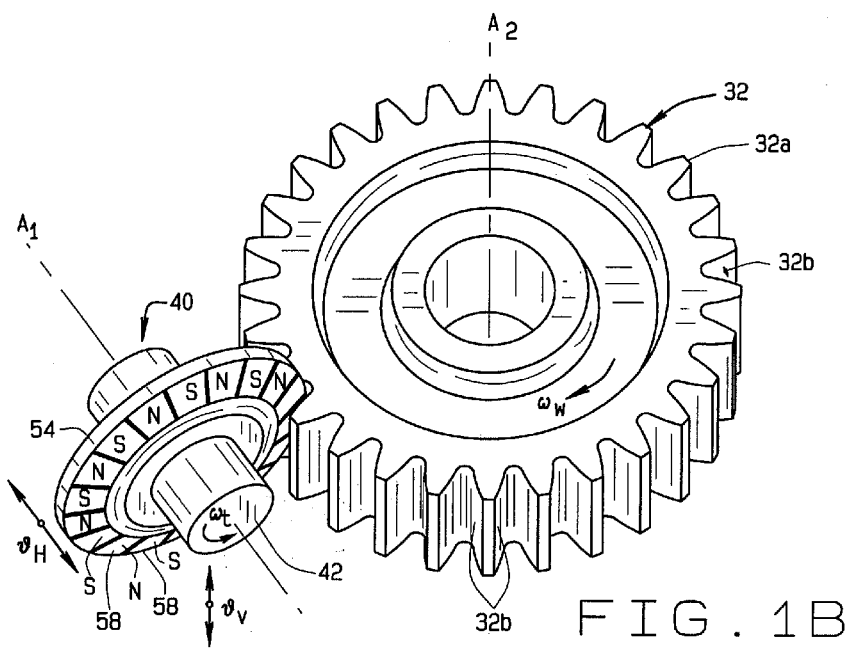
FIG. 1b is a perspective view of a permanent magnet member of the apparatus proximate a gear to heat treat the teeth of the gear.

With reference to FIG. 1b, the movement of the rotating magnet assembly 40 in the vertical and horizontal planes and the rotational movement of the gear 32 brings new surfaces 32b of the gear into a heating zone or heating area H (FIG. 5) in the vicinity of the gap G between the magnet assembly 40 and the gear tooth surfaces 32b. Thus, for example, with the gear 32 mounted on the work-piece holder 30, the magnet assembly 40 can be lowered (or raised) via movement of the spindle assembly 22 along the guide 20 to bring the magnet assembly 40 into heating relationship with the tooth surfaces of the gear, as seen in FIG. 1b. As is known, by rotating the magnet assembly 40 between the tooth surfaces 32b, and by moving the magnet assembly along the tooth width (if desired), the tooth surfaces will be heated. When the two surfaces have been heat treated, the spindle unit 22 (and hence the magnet assembly 40) can be moved in a vertical plane to move the magnet assembly 40 out of the heating zone H. The gear 32 can then be rotated to bring two new tooth surfaces into alignment with the magnet assembly. The magnet assembly 40 can then be lowered to bring the magnet assembly into heating proximity with the two new tooth surfaces. This process can be continued until all the tooth surfaces have been heat treated. This describes a step-wise feed motion.

The distance between the gear surfaces and the magnet assembly 40 is determined by the distance between the axes $A_1$ and $A_2$. Although not shown in FIG. 1a, a third guide could be provided to enable the magnet assembly to move in a third axis perpendicular to the axes $A_1$ and $A_2$. This would allow for altering the distance between the axes $A_1$ and $A_2$ and hence the gap between the magnet assembly 40 and the surfaces to be heat treated. It would also allow for a magnet assembly of determined diameter to be used to heat treat a broader range of gear diameters.

Figure 5:
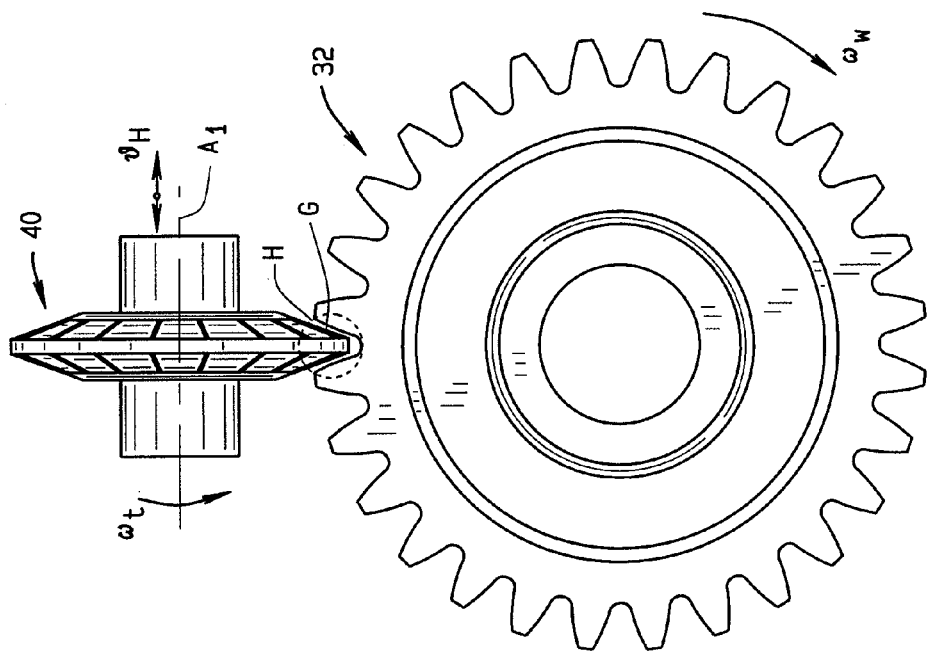
FIG. 5 is elevational view similar to that of FIG. 4, but rotated 90° relative to FIG. 4.

For heating spur gear tooth surfaces, the rotational motion of the work-piece 32 (at the rate $\omega_t$) and the horizontal motion of the magnet assembly 40 (at rate $V_H$) are synchronized or coordinated to establish a conjugate motion, similar to the mesh of a rack and pinion. This conjugate motion scans or passes the gear tooth surface 32b along the tooth flank, feeding a new surface into the inductive heating zone. The vertical motion of the magnet assembly (at rate $V_V$) scans (or passes by) gear tooth surface 32b along the gear width. That is, the magnet assembly is moved across the gear width, from one surface of the gear to the opposite surface of the gear (i.e., from left to right or right to left with reference to FIG. 4). This brings an unheated surface into the heating zone H (FIG. 5). It is conceivable that in this case, the feed motions (the rotational motion of the work-piece and the horizontal motion of the magnet assembly) are continuous and the vertical feed motion of the magnet assembly is stepwise.

For helical gears, the axis A1 is tilted by an indexing device (not shown) and $V_H$ is composed of two components: a continuous component $V_{H1}$ and a stepwise component $V_{H2}$. The continuous component $V_{H1}$ is synchronized with $\omega_w$ to establish a conjugate motion between the magnet assembly 40 and the gear 32; and the stepwise component $V_{H2}$ is synchronized with $V_V$ to produce the helical motion. Worm gears could be treated as well. However, for a worm gear, the worm gear would need to be rotated about an axis that is parallel to the axis $A_1$.

Although vertical and horizontal feed motions of the magnet assembly (at rates $V_H$ and $V_V$) are described with respect to movement of the magnet assembly 40 (by moving the slide unit and the spindle unit), the vertical and horizontal feed motions could be produced by moving the work-piece holder 30 (and hence the work-piece 32) in horizontal and vertical axis. In this instance, all the feed motions would involve movement of the gear 32 relative to the magnet assembly 40, and the magnet assembly would be rotated in a fixed position in an x,y,z coordinate system. As discussed above in conjunction with movement of the spindle unit and slide unit, the apparatus 10 could be configured to enable the work-piece holder 30 (and hence the work-piece 32) to be moved in three axes.

In the illustrative embodiment described, the entire gear tooth surface is heat treated by scanning (or passing) of the magnet assembly along both the tooth flank and the tooth width, as shown in FIGS. 4 and 5. The advantage here is that the same tool piece (i.e., magnet assembly) can be used to heat gears of various modules with identical pressure angles. This will save in tooling cost for low volume production. Alternatively, the tapered surfaces 50b of the disk 46, as well as the tapered or sloped side of the magnets (which define the north and south poles of the magnets) can be profiled to copy gear tooth gap profiles, as shown in FIG. 5. In this case, the horizontal feeding motion $V_H$ is not necessary, and the gear tooth surface is scanned by the magnet assembly along the gear width.

The invention claimed is:

1. A method for heat treating a gear having gear teeth; the method including:
   (a) removably mounting the gear on a work-piece holder;
   (b) moving at least one of either a magnet assembly and the work-piece holder to bring the gear and the magnet assembly into heating proximity;
   (c) rotating the magnet assembly for a desired amount of time while the magnet assembly and gear are in heating proximity to each other to heat treat surfaces of the gear teeth; and
   (d) moving at least one of either the magnet assembly and the work-piece holder relative to the other to bring different surfaces of the gear into heating proximity with the magnet assembly; and
   (e) repeating steps (b)-(d) for each gear tooth until all gear teeth surfaces are heat treated
   wherein the magnet assembly includes a disk having a circumferential surface and a plurality of magnets or groups of magnets adjacent the surface; the magnets or groups of magnets having opposed faces defining north and south poles; the magnets or groups of magnets being arranged about the disk such that the poles alternate; and
   wherein the step of moving at least one of either the magnet assembly and the work-piece holder includes positioning the magnet assembly and the work-piece holder relative to each other with the disk between adjacent gear teeth such that the opposed faces of the magnets or groups of magnets of the magnet assembly face surfaces of the gear teeth to be treated.

2. The method of claim 1 wherein step (d) comprises moving one of the magnet assembly and the work-piece holder relative to the other to separate the magnet assembly and the gear such that the magnet assembly and gear are no longer in heat treating proximity to each other; rotating the work-piece holder to bring untreated gear teeth surfaces into position to be heated; and then moving the at least one of the magnet assembly and the work-piece holder relative to the other to bring the untreated gear teeth surfaces of the gear into heating proximity with the magnet assembly.

3. The method of claim 1 wherein steps (b) and (d) comprise moving the magnet assembly.

4. The method of claim 3 wherein moving the magnet assembly comprises moving the magnet assembly in a vertical plane.

5. The method of claim 3 wherein the magnet assembly is continuously moved in a reciprocating fashion past the gear teeth surfaces; the magnet assembly being moved at a rate which will allow for the gear teeth surfaces to be heat treated a desired amount.

6. The method of claim 5 wherein the work-piece holder is rotated in a step wise fashion, the work-piece holder being rotated when the magnet assembly is out of heating proximity with the gear, to move untreated gear teeth surfaces into the path of the magnet assembly to heat treat the gear teeth surfaces.

\* \* \* \* \*